US012603237B2

(12) United States Patent
Huang

(10) Patent No.: US 12,603,237 B2
(45) Date of Patent: Apr. 14, 2026

(54) PUSH BUTTON FOR ACTUATING SWITCH

(71) Applicant: 3M INNOVATIVE PROPERTIES COMPANY, St. Paul, MN (US)

(72) Inventor: Yi-Chi Huang, Santa Clara, CA (US)

(73) Assignee: 3M Innovative Properties Company, St. Paul, MN (US)

( * ) Notice: Subject to any disclaimer, the term of this patent is extended or adjusted under 35 U.S.C. 154(b) by 236 days.

(21) Appl. No.: 18/554,121

(22) PCT Filed: Apr. 4, 2022

(86) PCT No.: PCT/US2022/023312

§ 371 (c)(1),
(2) Date: Oct. 5, 2023

(87) PCT Pub. No.: WO2022/216610

PCT Pub. Date: Oct. 13, 2022

(65) Prior Publication Data

US 2024/0212951 A1 Jun. 27, 2024

Related U.S. Application Data

(60) Provisional application No. 63/171,270, filed on Apr. 6, 2021.

(51) Int. Cl.
*H01H 13/14* (2006.01)
*H01H 13/04* (2006.01)

(52) U.S. Cl.
CPC ............ *H01H 13/14* (2013.01); *H01H 13/04* (2013.01)

(58) Field of Classification Search
CPC ...... H01H 13/14; H01H 13/04; H01H 9/0235; H01H 2013/525; H01H 2215/004; H01H 2221/05; H01H 2231/036; H01H 13/52; H01H 3/12
USPC ................................ 200/341, 344, 345, 520
See application file for complete search history.

(56) References Cited

U.S. PATENT DOCUMENTS

| | | | | |
|---|---|---|---|---|
| 6,737,596 B1 * | 5/2004 | Hein | H01H 13/702 200/341 |
| 8,209,868 B2 * | 7/2012 | Schnak | H01H 13/023 200/341 |
| 8,212,160 B2 | 7/2012 | Tsao | |
| 2006/0050917 A1 | 3/2006 | Skillicorn et al. | |
| 2008/0026699 A1 | 1/2008 | Smith | |

(Continued)

FOREIGN PATENT DOCUMENTS

WO 2016019360 A1 2/2016

OTHER PUBLICATIONS

International Search Report for PCT International Application No. PCT/US2022/023312, mailed on Jun. 29, 2022, 4 pages.

*Primary Examiner* — Lheiren Mae A Caroc
(74) *Attorney, Agent, or Firm* — Katherine M. Scholz

(57) ABSTRACT

A device includes a device body comprising a first side; a switch disposed on the first side and comprising a button having a push direction and an active area perpendicular to the push direction; and a button cover. The button cover has a first major face facing outward and defining an actuatable area surrounded by a perimeter; and a second major face opposite of the first major face and facing the device. On the second major face are a switch receiving area constructed to contact the active area of the switch; and a plurality of ribs extending from the switch receiving area toward the perimeter.

18 Claims, 12 Drawing Sheets

(56) References Cited

U.S. PATENT DOCUMENTS

| | | | |
|---|---|---|---|
| 2020/0185164 | A1 | 6/2020 | Huang et al. |
| 2020/0203095 | A1 | 6/2020 | Guy et al. |

* cited by examiner

PUSH BUTTON FOR ACTUATING SWITCH

CROSS REFERENCE TO RELATED APPLICATIONS

This application is a national stage filing under 35 U.S.C. 371 of PCT/US2022/023312, filed Apr. 4, 2022, which claims the benefit of U.S. Provisional Application No. 63/171,270, filed Apr. 6, 2021, the disclosure of which is incorporated by reference in its/their entirety herein.

FIELD

The present disclosure relates to push buttons for actuating a switch, such as a dome switch. The present disclosure further relates to push buttons with an expanded actuatable area for actuating a switch.

SUMMARY

A device includes a device body comprising a first side; a switch disposed on the first side and comprising a button having a push direction and an active area perpendicular to the push direction; and a button cover. The button cover has a first major face facing outward and defining an actuatable area surrounded by a perimeter; and a second major face opposite of the first major face and facing the device. On the second major face are a switch receiving area constructed to contact the active area of the switch; and a plurality of ribs extending from the switch receiving area toward the perimeter. The actuatable area and the active area of the button have a ratio of 10 or more to 1; 20 or more to 1; 30 or more to 1; 40 or more to 1; 50 or more to 1; or 60 or more to 1. The actuatable area and the active area of the button have a ratio of up to 200 to 1; up to 150 to 1; or up to 100 to 1. The switch may be a dome switch.

The switch receiving area may include a recess for receiving the button. The second major face may include a groove adjacent the perimeter. The plurality of ribs may extend from the switch receiving area to the groove. The plurality of ribs may be equidistant from one another. The plurality of ribs may include 8 or more, 10 or more, 12 or more, or 14 or more ribs, and 24 or fewer, 22 or fewer, 20 or fewer, or 18 or fewer ribs, or 16 ribs.

The button cover may be made of molded thermoplastic elastomer. The button cover may be formed of a polymeric material having a Shore A hardness of 72 or greater, 75 or greater, or 78 or greater, and 85 or less or 82 or less.

DEFINITIONS

Figure 1B:
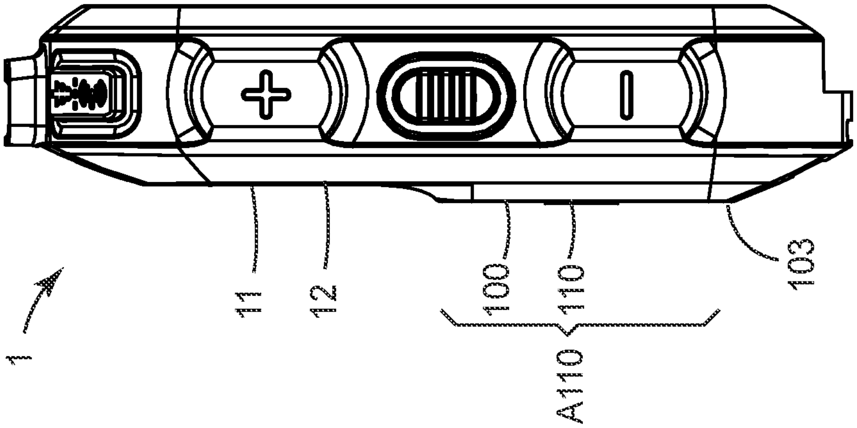
FIG. 1B is a side view of the device of FIG. 1A according to an embodiment.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, the terms "polymer" and "polymeric material" include, but are not limited to, organic homopolymers, copolymers, such as for example, block, graft, random and alternating copolymers, terpolymers, etc., and blends and modifications thereof. Furthermore, unless otherwise specifically limited, the term "polymer" shall include all possible geometrical configurations of the material. These configurations include, but are not limited to, isotactic, syndiotactic, and atactic symmetries.

The term "elastomer" is used here to refer to a polymer that is viscoelastic (has both viscosity and elasticity).

The term "thermoplastic elastomer" is used here to refer to a polymer that exhibits both thermoplastic and elastomeric properties.

The term "substantially" as used here has the same meaning as "significantly," and can be understood to modify the term that follows by at least about 90%, at least about 95%, or at least about 98%.

The term "not substantially" as used here has the same meaning as "not significantly," and can be understood to have the inverse meaning of "substantially," i.e., modifying the term that follows by not more than 25%, not more than 10%, not more than 5%, or not more than 2%.

The term "about" is used here in conjunction with numeric values to include normal variations in measurements as expected by persons skilled in the art, and is understood to have the same meaning as "approximately" and to cover a typical margin of error, such as ±5% of the stated value.

Terms such as "a," "an," and "the" are not intended to refer to only a singular entity, but include the general class of which a specific example may be used for illustration.

The terms "a," "an," and "the" are used interchangeably with the term "at least one." The phrases "at least one of" and "comprises at least one of" followed by a list refers to any one of the items in the list and any combination of two or more items in the list.

As used here, the term "or" is generally employed in its usual sense including "and/or" unless the content clearly dictates otherwise. The term "and/or" means one or all of the listed elements or a combination of any two or more of the listed elements.

The recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" or "at least" a particular value, that value is included within the range.

As used here, "have," "having," "include," "including," "comprise," "comprising," or the like are used in their open-ended sense, and generally mean "including, but not limited to." It will be understood that "consisting essentially of," "consisting of," and the like are subsumed in "comprising" and the like. As used herein, "consisting essentially of," as it relates to a composition, product, method, or the like, means that the components of the composition, product, method, or the like are limited to the enumerated components and any other components that do not materially affect the basic and novel characteristic(s) of the composition, product, method, or the like.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Any direction referred to here, such as "top," "bottom," "left," "right," "upper," "lower," and other directions and orientations are described herein for clarity in reference to the figures and are not to be limiting of an actual device or system or use of the device or system. Devices or systems as described herein may be used in a number of directions and orientations.

DETAILED DESCRIPTION

The present disclosure relates to push buttons for actuating a switch, such as a dome switch. The present disclosure further relates to push buttons with an expanded active area for actuating a switch.

In some cases, it is desirable to provide a push button with an expanded area for actuating a switch, such as a dome switch. For example, it may be desirable to provide a push button with an expanded actuatable area to make it easier to actuate the switch, to require less precision by the user, and/or to improve accessibility. An example of a device that may benefit from such a push button with expanded actuatable area is a communications device, such as a hand-held two-way radio. It is also desirable to provide a push button with a low profile and easy construction and assembly.

According to an embodiment, a device with a push button includes a switch button and a button cover that is constructed to expand the actuatable area of the switch button to be multiple times larger than the switch button itself. The button cover may have a simple construction that may be achieved, for example, by injection molding a single integral piece from a polymeric material. The button cover may be injection molded, for example, from a thermoplastic elastomer.

Figure 1A:
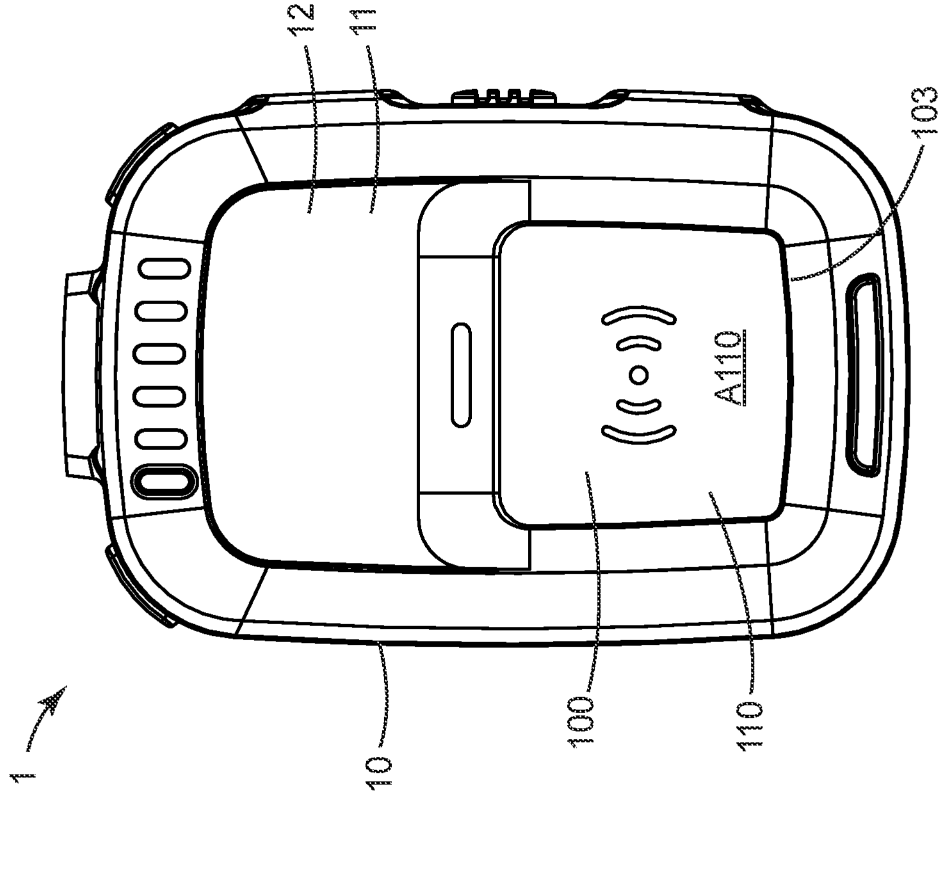
FIG. 1A is a front view of an exemplary device with a push button with expanded actuatable area according to an embodiment.
Figure 2A:
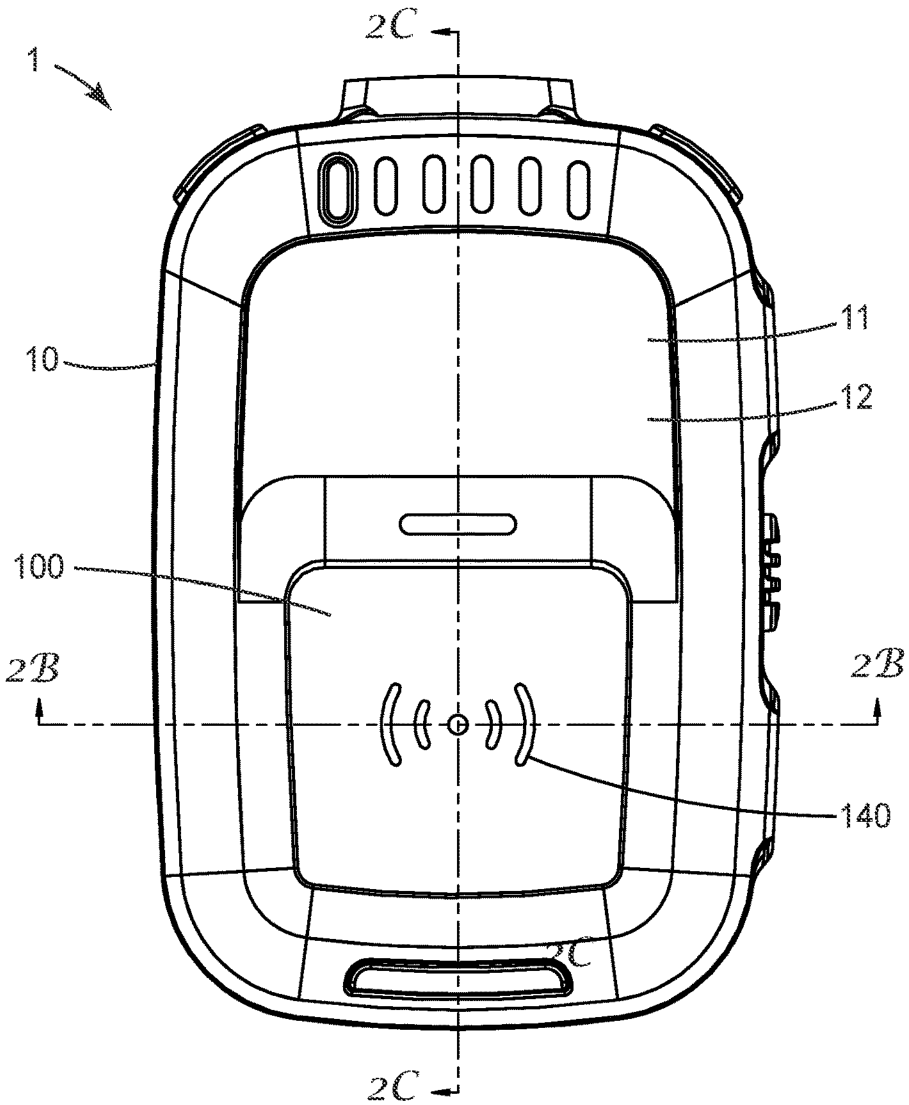
FIG. 2A is a front view of the device of FIG. 1A according to an embodiment.
Figure 2B:
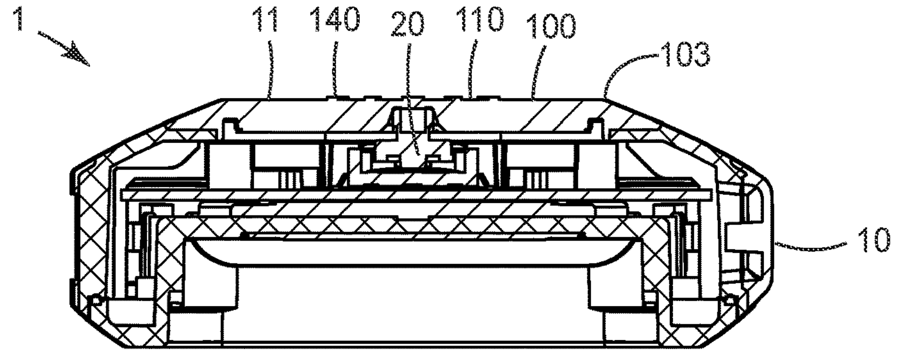
FIGS. 2B and 2C are cross-sectional views of the device of FIG. 2A according to an embodiment.
Figure 2D:
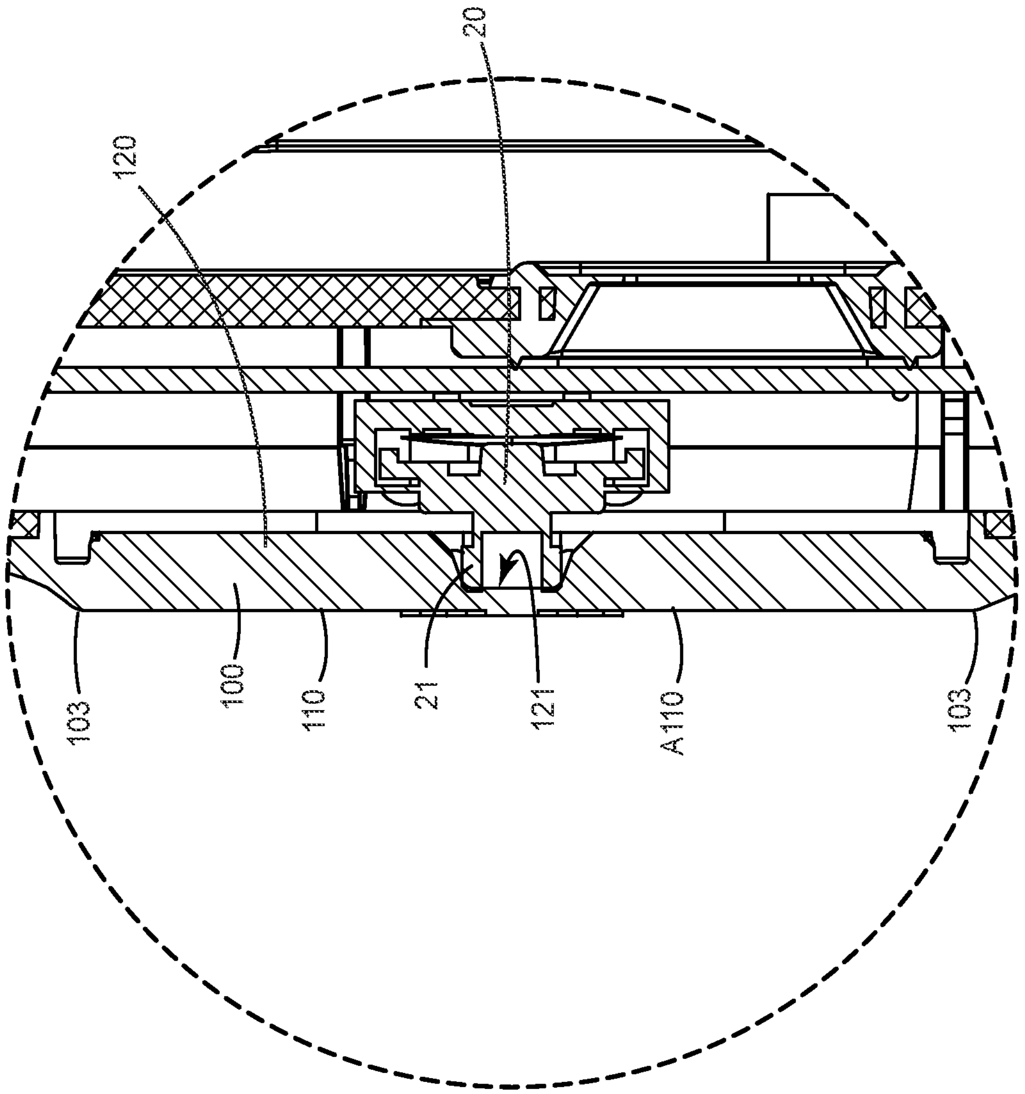
FIG. 2D is a detail view of the cross section of FIG. 2C according to an embodiment.
Figure 2C:
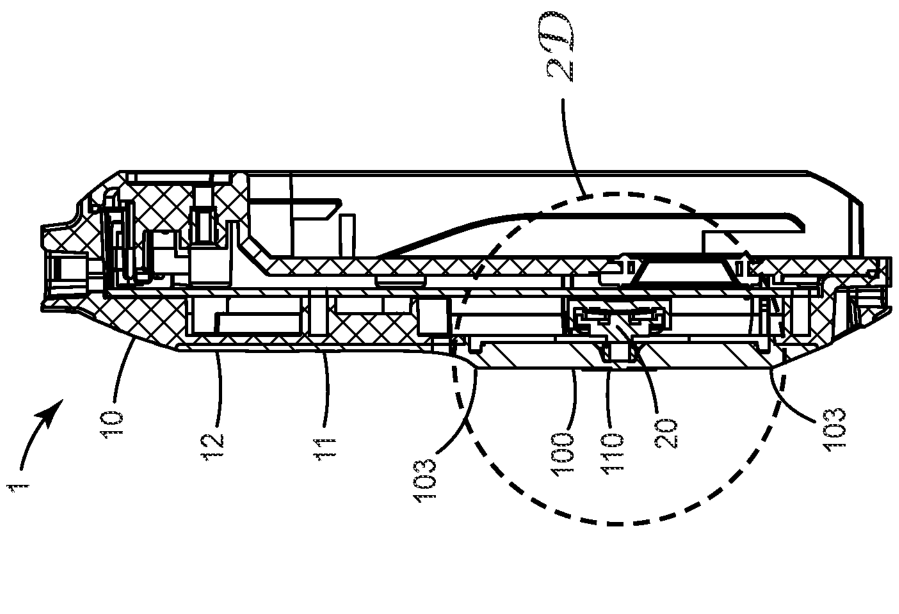

Referring now to FIGS. 1A and 1B, an exemplary device 1 with a push button having an expanded actuatable area A110 is shown. The exemplary device 1 has a body 10 with a first side 11. A switch 20 (shown in FIGS. 2B-2D) that includes a switch button 21 is disposed along the first side 11. The switch 20 is covered by a button cover 100. In the exemplary device 1 the first side 11 is the front side of the device 1. However, the switch 20 could, of course, be disposed anywhere on the device. Preferably the switch 20 is disposed on a side of the device 1 that has sufficient space for expanded actuatable area A110 of the button cover 100. This may be a major side of the device 1, as in the example shown.

The button cover 100 has a first major face 110 that faces outward and defines the actuatable area A110. The actuatable area A110 is surrounded by a perimeter 103. According to an embodiment, the switch 20 can be actuated by pushing (e.g., applying a force to) anywhere on the actuatable area A110. Because the actuatable area A110 is multiple times larger than the switch 20, actuating the switch 20 is easier than if the user would need to push more precisely on the switch button 21 itself. The shape of the button cover 100, as defined by the perimeter 103, may be any suitable shape. In the example shown, the button cover 100 has a substantially square or slightly trapezoidal perimeter 103 with rounded corners. However, the button cover 100 could be round or have any other suitable shape.

Referring now to FIGS. 2A-2D, the switch 20 is disposed on the first side 11 of the device 1 under the button cover 100. The switch 20 includes a button 21. The button 21 protrudes outward in a direction perpendicular to the first side 11 of the device 1. The button 21 has a push direction 23 (shown in FIG. 3B). According to an embodiment, the push direction 23 is perpendicular to the first side 11 of the device 1. The switch 20 can be actuated by pushing on the button 21 in the push direction 23. The switch 20 (e.g., the button 21) has an active area A20. The switch 20 can be actuated by pushing on the active area A20. The active area A20 may be perpendicular to the push direction 23 and parallel to the actuatable area A110 of the button cover 100.

In some embodiments, the actuatable area A110 extends to the perimeter 103 on all sides. Thus, the switch 20 may be actuatable by applying a force in the push direction 23 anywhere within the perimeter 103. According to an embodiment, the actuatable area A110 of the button cover 100 is larger (e.g., multiple times larger) than an average fingertip of a user. The actuatable area A110 of the button cover 100 may be multiple times larger than the active area A20 (e.g., the tip) of the button 21.

According to an embodiment, the actuatable area A110 of the button cover 100 and the active area A20 of the switch 20 have a ratio of 10 or more to 1; 20 or more to 1; 30 or more to 1; 40 or more to 1; 50 or more to 1; or 60 or more to 1. The actuatable area A110 of the button cover 100 and the active area A20 of the switch 20 may have a ratio of up to 200 to 1; up to 150 to 1; or up to 100 to 1. In some embodiments, the actuatable area A110 of the button cover 100 and the active area A20 of the switch 20 have a ratio of 10:1 to 200:1, from 20:1 to 150:1, or from 30:1 to 100:1.

Figure 3A:
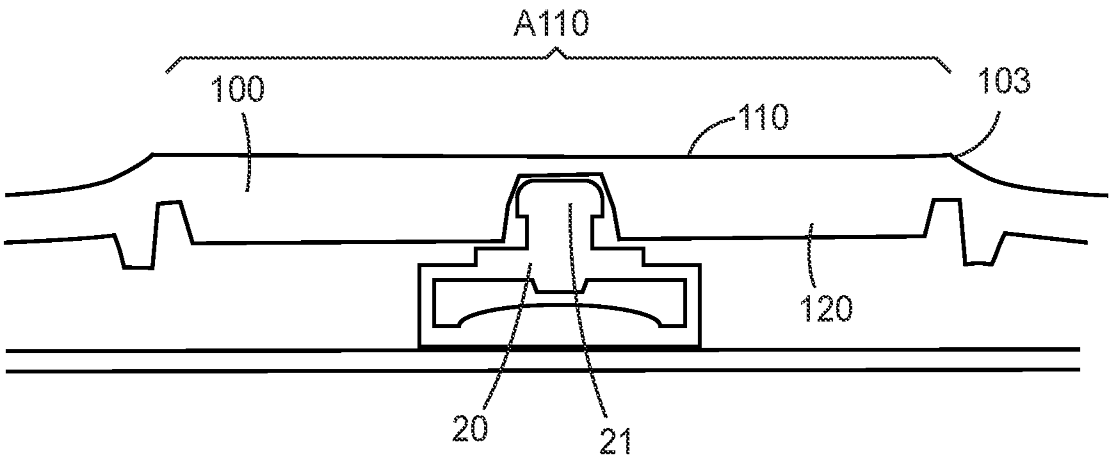
FIG. 3A is a schematic partial cross-sectional view of the device of FIG. 1A according to an embodiment.
Figure 3B:
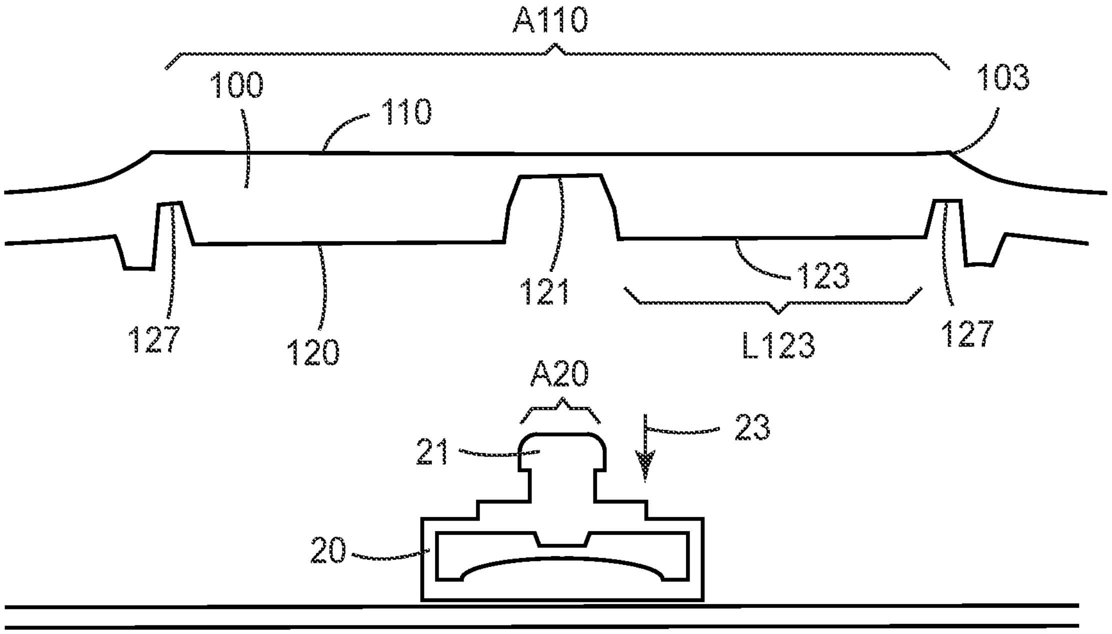
FIG. 3B is an exploded view of the cross section of FIG. 3A.
Figure 4B:
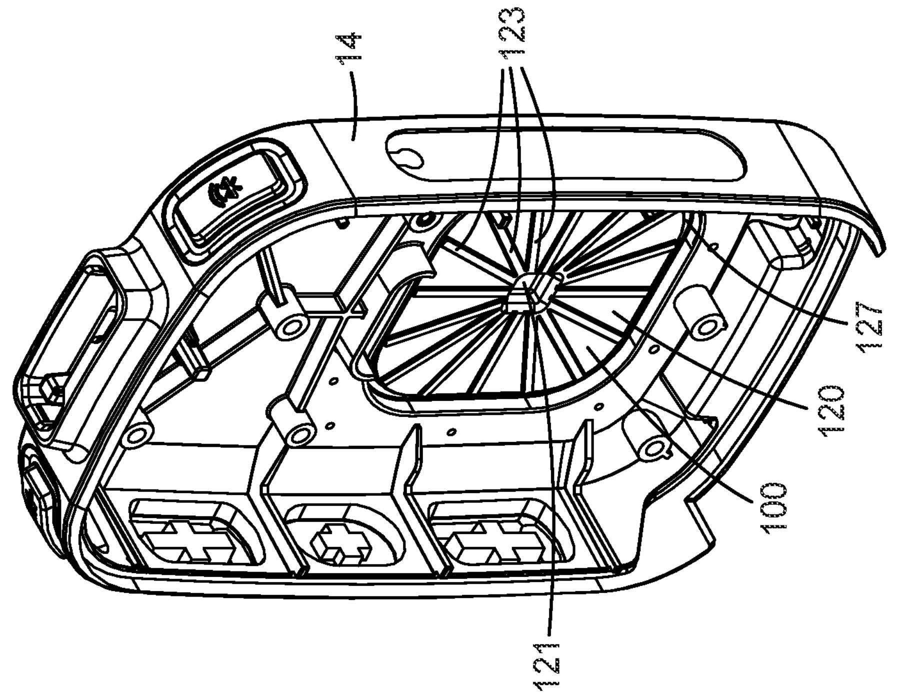
FIG. 4B is a perspective view of the frame of FIG. 4A.
Figure 4A:
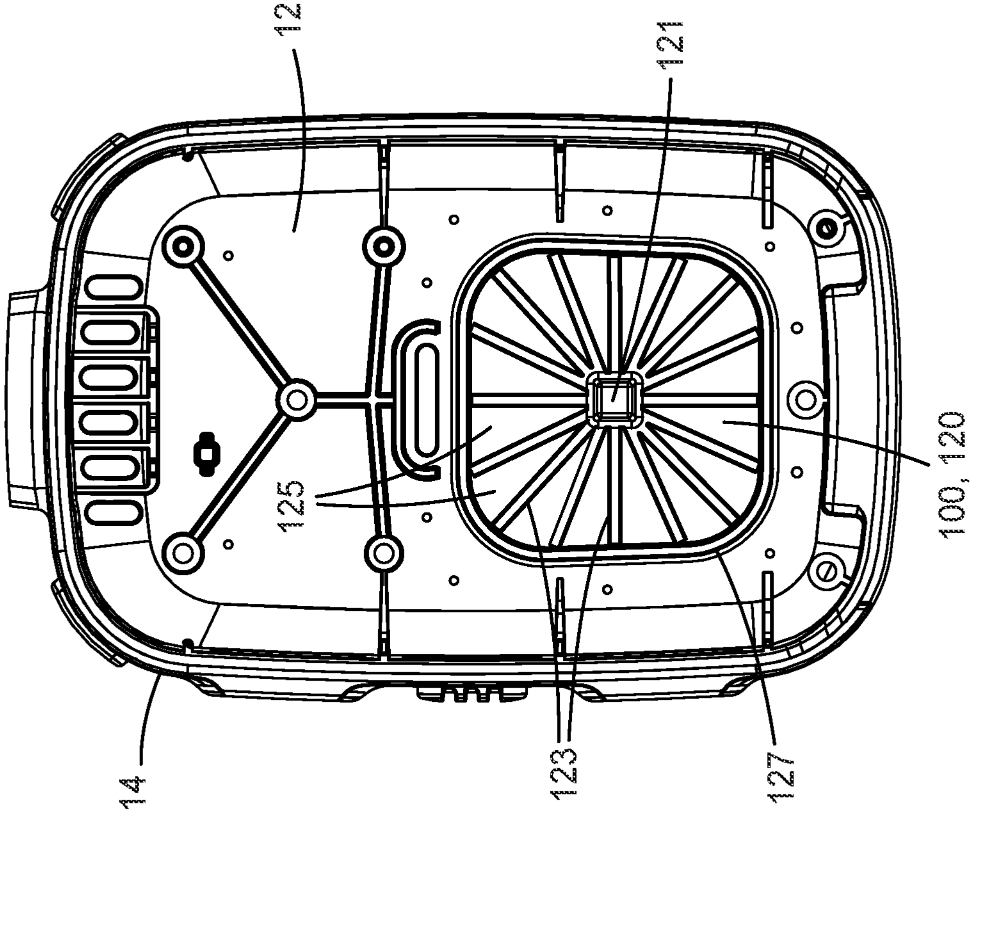
FIG. 4A is a back view of a frame of the device of FIG. 1A according to an embodiment.
Figure 5A:
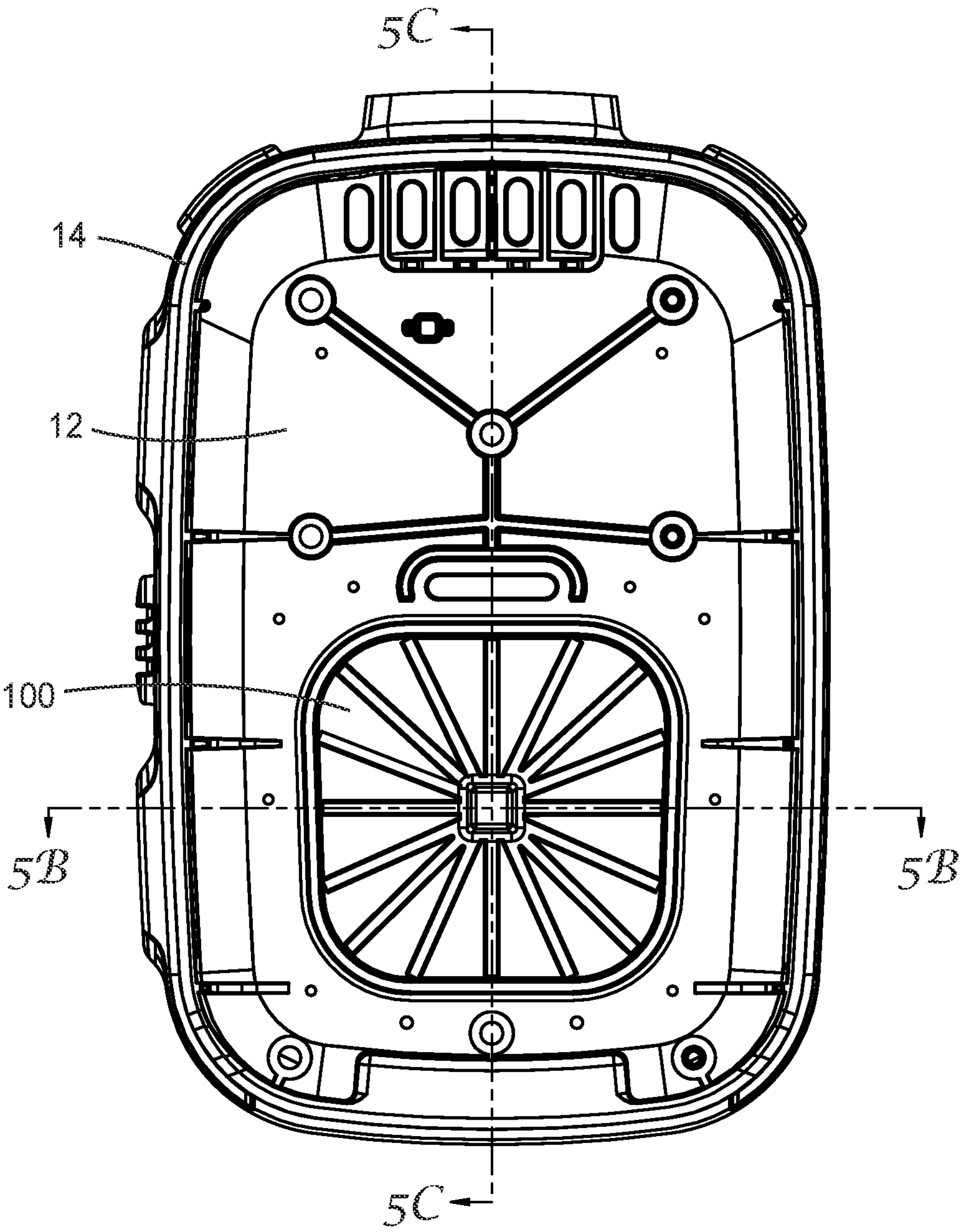
FIG. 5A is a back view of a frame of the device of FIG. 1A according to an embodiment.
Figure 5B:
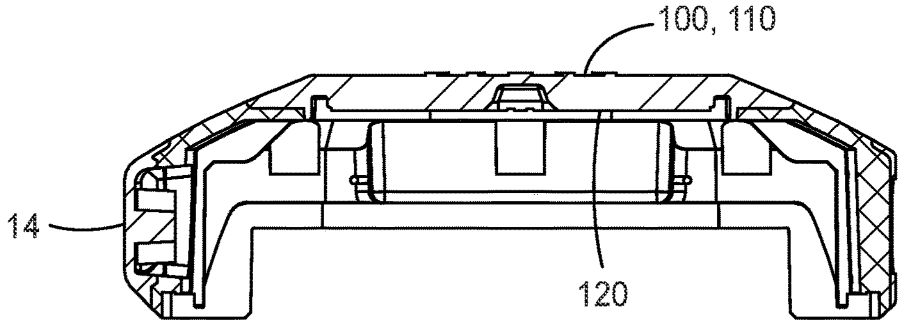
FIGS. 5B and 5C are cross-sectional views of the frame of FIG. 5A according to an embodiment.
Figure 5C:
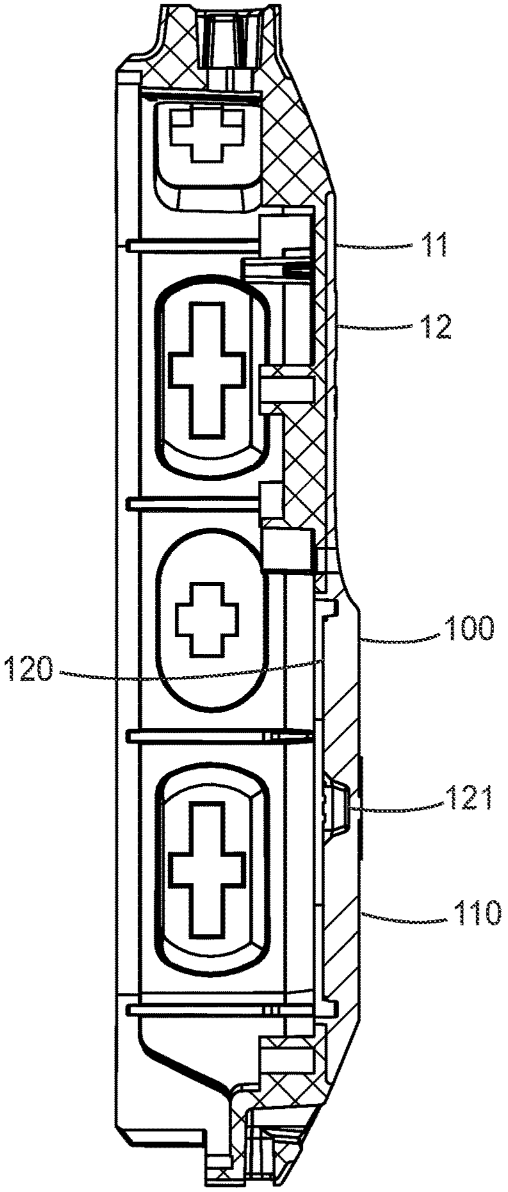
Figure 6A:
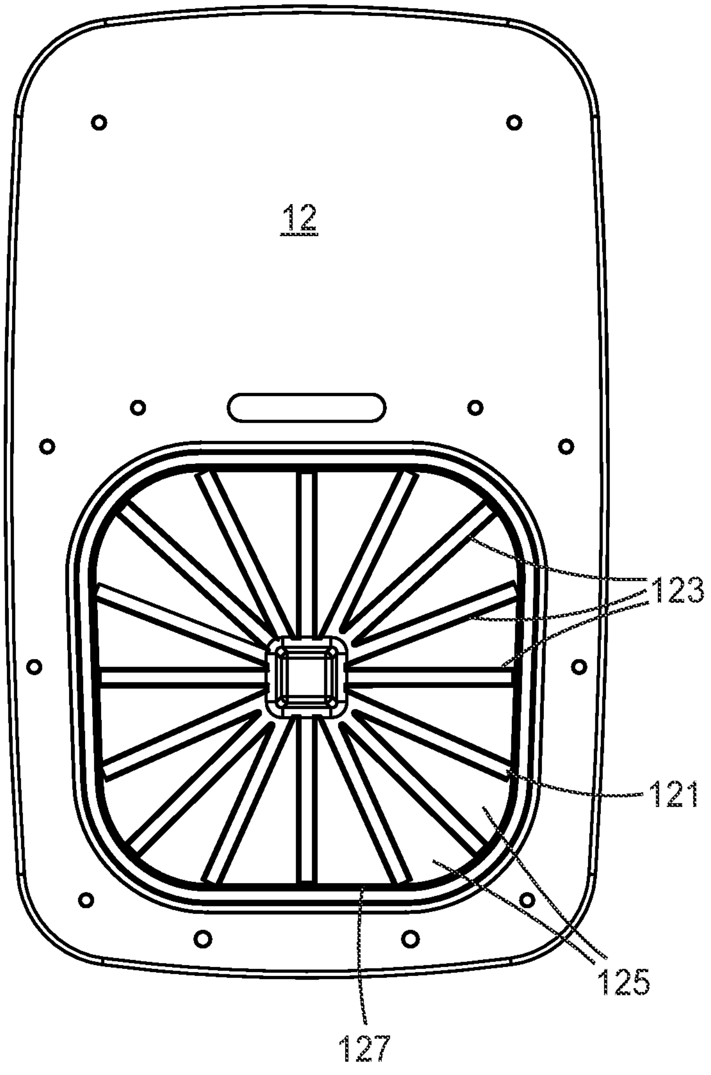
FIG. 6A is a back view of a face plate of the device of FIG. 1A according to an embodiment.
Figure 6C:
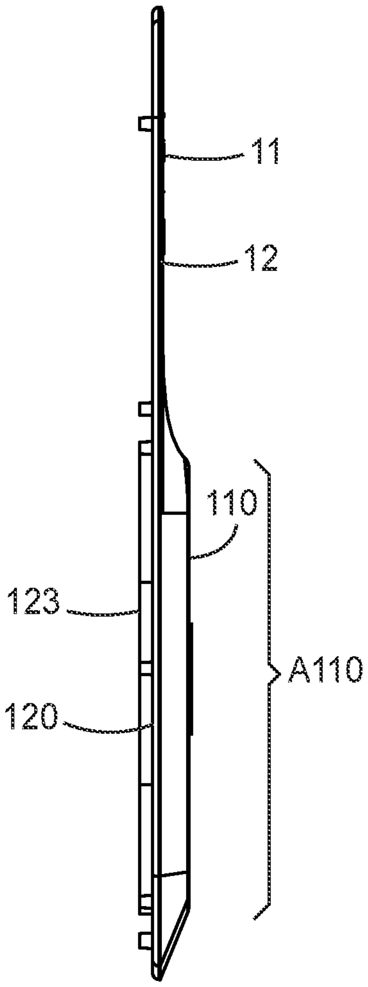
FIG. 6C is bottom view of the face plate of FIG. 6A according to an embodiment.
Figure 6B:
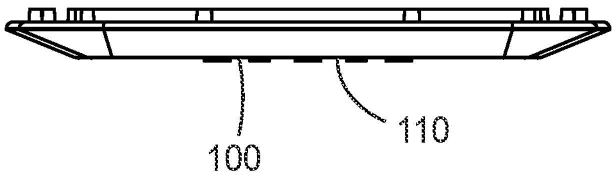
FIG. 6B is side view of the face plate of FIG. 6A according to an embodiment.
Figure 6E:
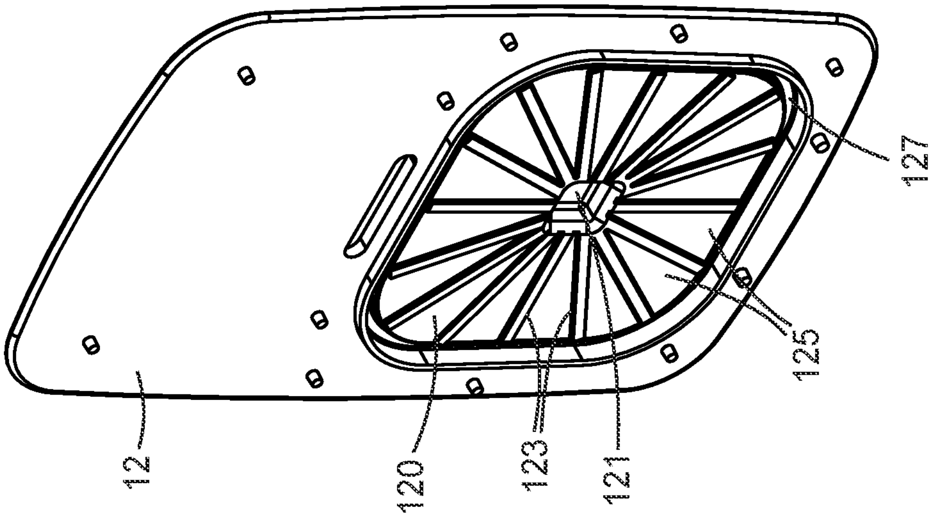
FIG. 6E is a back perspective view of the face plate of FIG. 6A according to an embodiment.
Figure 6D:
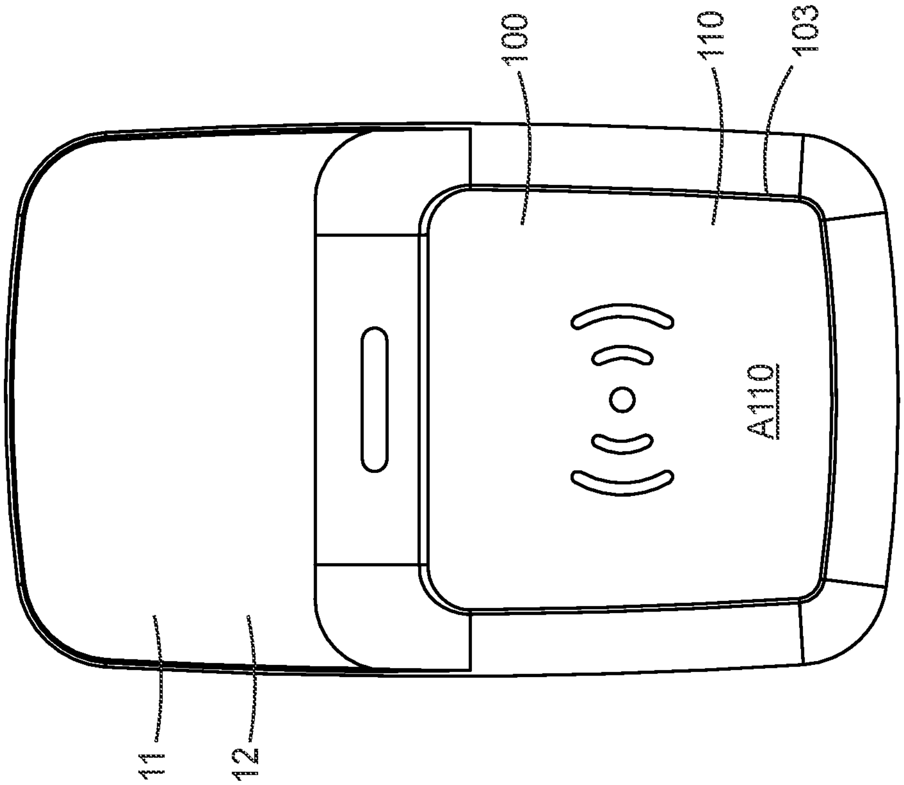
FIG. 6D is a front view of the face plate of FIG. 6A according to an embodiment.

The button cover 100 further has a second major face 120 opposite of the first major face 110. The second major face 120 faces toward the device. On the second major face 120, the button cover 100 has a switch receiving area 121, as show, for example, in FIGS. 3A-5C, 7A, 7C, and 7E. The switch receiving area 121 is constructed to contact the active area A20 of the switch 20. The switch receiving area 121 may have any suitable shape and size that can accommodate the button 21. The switch receiving area 121 may define a recess for receiving the button 21, as shown in FIGS. 3A and 3B. The switch receiving area 121 may have a similar shape as the button 21. For example, the button 21 and switch receiving area 121 may both be round or square, or any other suitable shape. However, the switch receiving area 121 does not necessarily have to conform to the exact shape of the button 21 as long as the switch receiving area 121 can contact the button 21 and transfer a force applied to the actuatable area A110 in the push direction 23 to the button 21. In some embodiments, the switch receiving area 121 may be flat instead or recessed. In some embodiments, the shapes of the button 21 and the switch receiving area 121 may be reversed in that button cover 100 may include a protrusion (e.g., a button) constructed to push down on the switch 20 (e.g., a switch receiving area).

According to an embodiment, the button cover 100 includes one or more features that enable the transfer of force and actuation of the switch 20 by pushing on the button cover 100 anywhere on the actuatable area A110. Such features may include one or more of (a) reinforcing ribs, (b) a groove that allows the button cover 100 to flex along or near the perimeter 103 and provides a more uniform force applied to the switch, and (c) a material with a suitable hardness (e.g., hardness on the Shore A scale). In some embodiments, the button cover 100 includes one, two, or all three of these features.

According to an embodiment, button cover 100 includes a plurality of ribs 123, as shown, for example, in FIGS. 4A-5A and 6A-6C. A "rib" is understood as a longitudinal structure extending along a surface, having a length that is greater (e.g., multiple times greater) than the width of the rib. The ribs 123 extend along the second major face 120 of the button cover 100. The ribs 123 may extend from the switch receiving area 121 toward the perimeter 103. The ribs 123 may extend radially from the switch receiving area 121 toward the perimeter 103. The ribs 123 may extend from the switch receiving area 121 to the groove 127.

The number, size, and spacing of the ribs 123 may be selected to achieve a suitable amount of support and rigidity for the button cover 100 to achieve the desired extended actuatable area A110. In some embodiments, the plurality of ribs 123 includes 8 or more, 10 or more, 12 or more, or 14 or more ribs. The plurality of ribs 123 may include 24 or fewer, 22 or fewer, 20 or fewer, or 18 or fewer ribs. The plurality of ribs 123 may include from 10 to 24 or from 12 to 20 ribs 123. In some embodiments, the plurality of ribs 123 includes 12, 16, or 20 ribs 123.

Figure 7B:
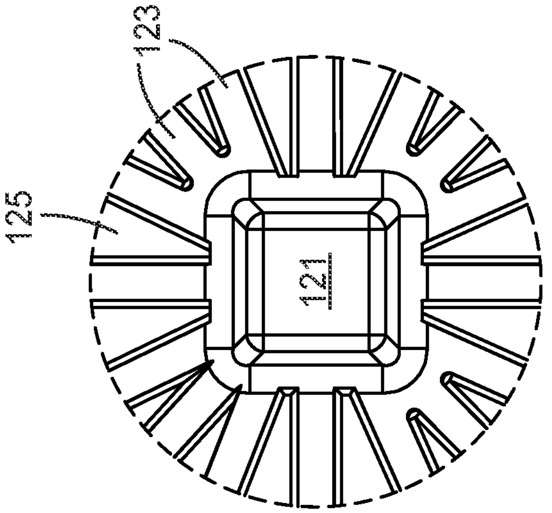
FIG. 7B is a detail view of the back view if FIG. 7A.

In some embodiments, the ribs 123 are spaced equidistant from one another. Adjacent ribs 123 may be spaced apart by an angle $\alpha$123, as shown in FIG. 7I. The angle $\alpha$123 between adjacent ribs 123 may be the same for each pair of adjacent ribs 123 (that is, the ribs 123 may be equidistant), or may vary from one pair to another. The angle $\alpha$123 between adjacent ribs 123 may be 10 degrees or greater, 15 degrees or greater, or 20 degrees or greater. The angle $\alpha$123 between adjacent ribs 123 may be 45 degrees or less, 36 degrees or less, or 26 degrees or less. The angle $\alpha$123 between adjacent ribs 123 may be from 10 to 45 degrees, from 15 to 36 degrees, or from 20 to 26 degrees. In some embodiments adjacent ribs 123 are spaced about 18 degrees, about 22.5 degrees, or about 30 degrees apart.

In some embodiments, the button cover 100 includes from 10 to 20 ribs 123 extending radially from the switch receiving area 121 toward the perimeter 103. In the embodiment shown in the figures, the button cover 100 includes 16 ribs 123 extending radially from the switch receiving area 121 to the perimeter 103.

The sizing and number of the ribs 123 may be such that near the switch receiving area 121, adjacent ribs are fused together, as shown in FIG. 7I.

Figure 7A:
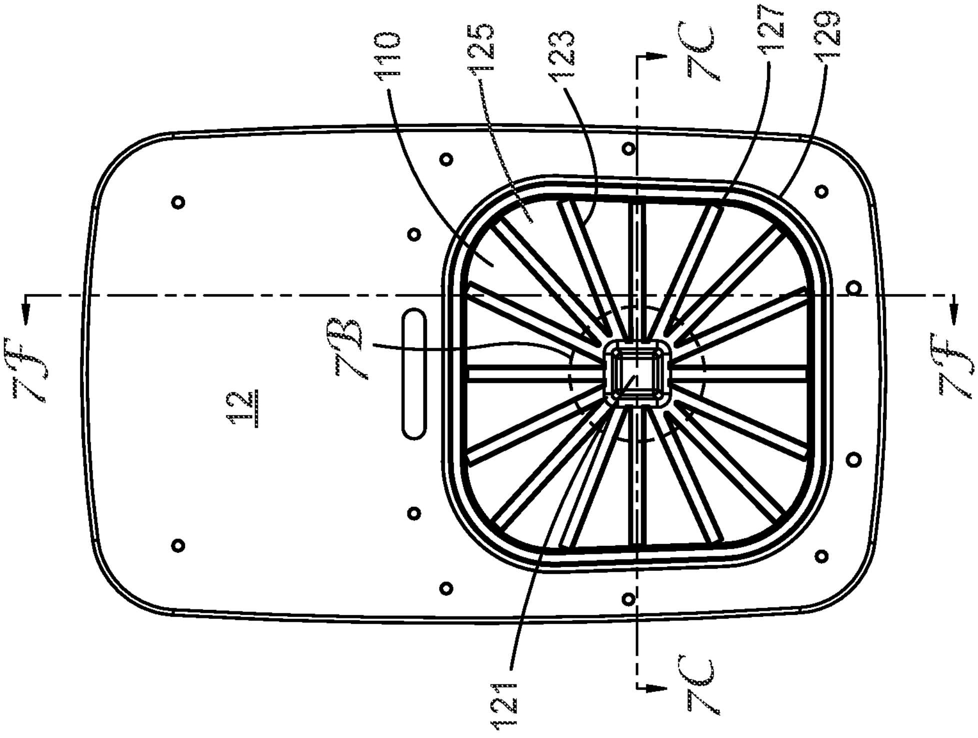
FIG. 7A is a back view of a face plate of the device of FIG. 1A according to an embodiment.
Figure 7E:
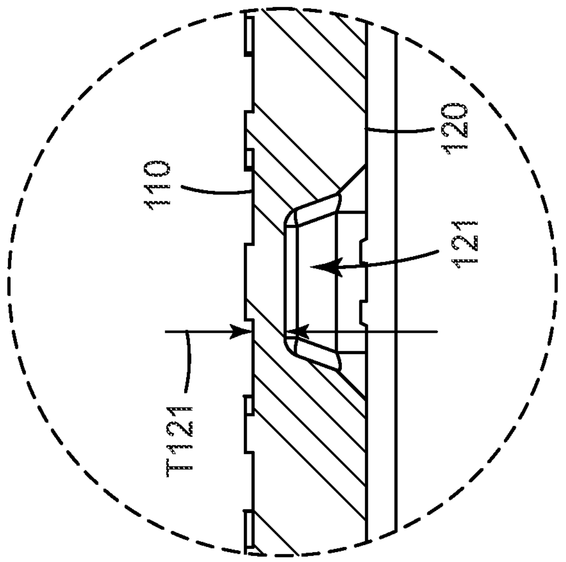
FIGS. 7D and 7E are detail views of the cross section of FIG. 7C.
Figure 7C:
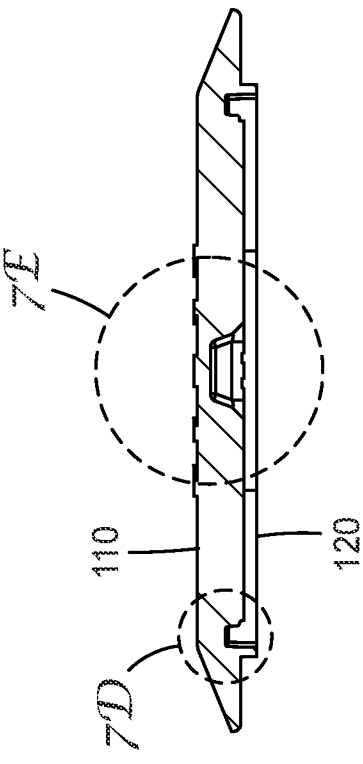
FIG. 7C is a cross section view of the face plate of FIG. 7A.
Figure 7D:
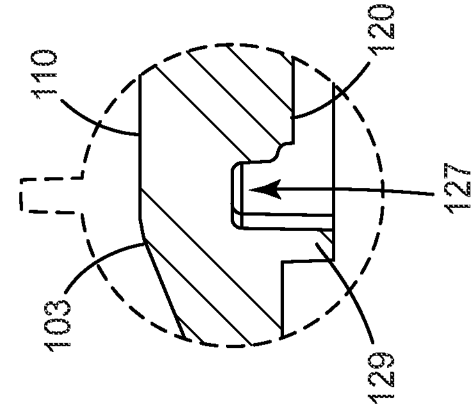
Figure 7I:
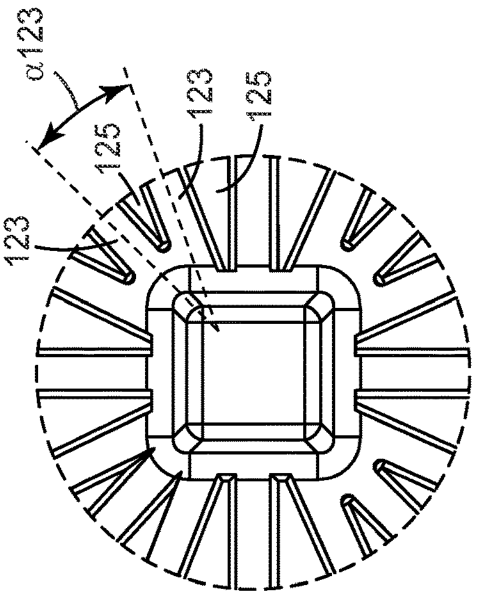
FIGS. 7G, 7H, and 7I are detail views of the cross section of FIG. 7F.

The button cover 100 may include a groove 127 on the second major face 120, as show, for example, in FIGS. 7A, 7C, and 7D. The groove 127 may extend along or near the perimeter 103 on the opposite side (the second major face 120) of the button cover 100. The groove 127 may form a continuous line that circumscribes the ribs 123. In some embodiments, the ribs 123 extend from the switch receiving area 121 to the groove 127. That is, the ribs 123 may have a length L123 that extends form the switch receiving area 121 to the groove 127, as shown in FIG. 3B.

In some embodiments, the button cover 100 includes from 10 to 20 ribs 123 extending radially from the switch receiving area 121 toward the groove 127. In the embodiment shown in the figures, the button cover 100 includes 16 ribs 123 extending radially from the switch receiving area 121 to the groove 127.

Figure 7G:
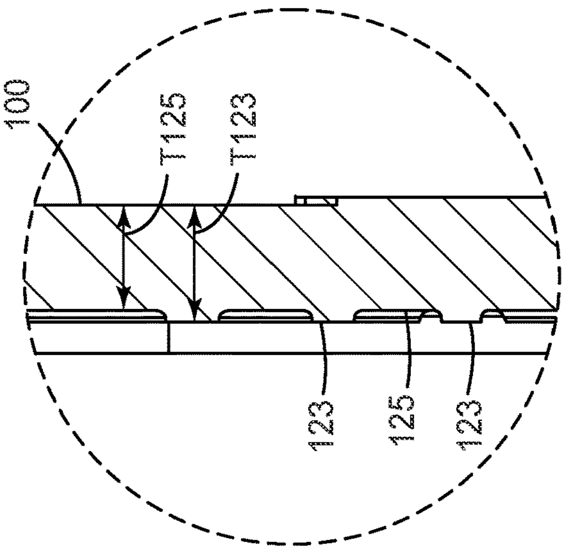

The shape and size of the ribs 123 may be selected to provide an amount of rigidity and support to the button cover 100 that enables the actuation of the switch 20 by pushing on the button cover 100 anywhere along the actuatable area A110. In a direction transverse to the first major face 110, the button cover 100 may have a first thickness T125 in an area 125 between ribs 123 and a second thickness T123 along a rib 123, as shown in FIG. 7G. The second thickness T123 may be at least 5%, at least 8%, or at least 10% greater than the first thickness T125. The second thickness T123 may be up to 30% or up to 20% greater than the first thickness T125. In some embodiments, the second thickness T123 is from 5% to 30% greater, from 8% to 25% greater, or from 10% to 20% greater than the first thickness T125. The ribs 123 may have any suitable cross-sectional shape. In one embodiment, the ribs 123 have a cross-sectional shape transverse to the length L123 that is substantially rectangular. The cross-sectional shape may have rounded corners. The intersection between the rib 123 and the area 125 between the ribs may be rounded as see in FIG. 7B.

The button cover 100 may have a third thickness T121 in the switch receiving area 121, as shown in FIG. 7E. The third thickness T121 may be at least 20%, at least 25%, or at least 30% of the first thickness T125 in the area 125 between ribs 123. The third thickness T121 may be up to 70%, up to 50%, or up to 40% of the first thickness T125. In some embodiments, the third thickness T121 is from 20% to 70%, from 25% to 50%, or from 30% to 40% of the first thickness T125.

Figure 7H:
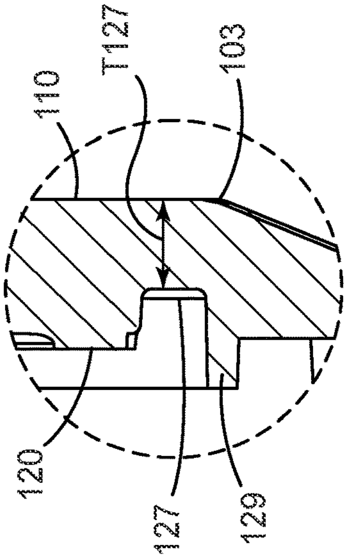
Figure 7F:
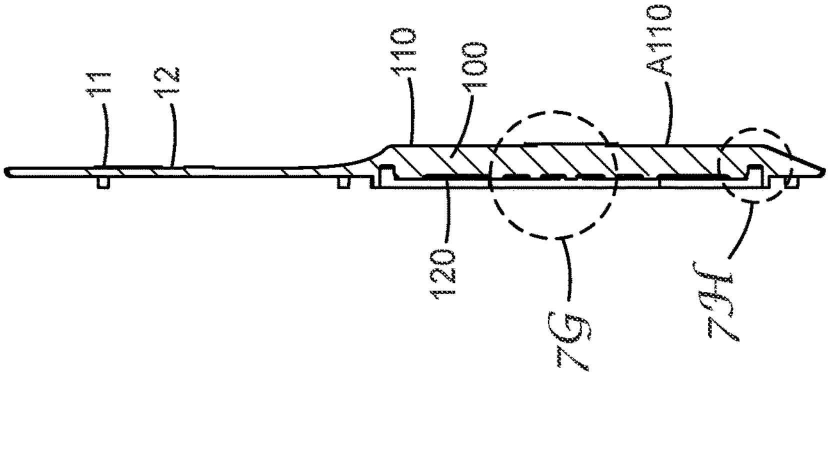
FIG. 7F is a cross section view of the face plate of FIG. 7A.

The button cover 100 may have a fourth thickness T127 along the groove, as shown in FIG. 7H. The fourth thickness T127 may be at least 20%, at least 25%, or at least 30% of the first thickness T125 in the area 125 between ribs 123. The fourth thickness T127 may be up to 70%, up to 50%, or up to 40% of the first thickness T125. In some embodiments, the fourth thickness T127 is from 20% to 70%, from 25% to 50%, or from 30% to 40% of the first thickness T125.

The button cover 100 may be a part of a face plate 12 of the device 1. The face plate 12 is shown, for example, in FIGS. 6A-7A. The first major face 110 of the button cover 100 may be parallel to the active area A20 of the switch 20 and the face plate 12 of the device body 10. The face plate 12 may further be attached to a frame 14, as show, for example, in FIGS. 5A-5C. The frame 14 may form the outside surface of at least a portion of the device 1.

The button cover 100 may be made of any suitable material. In some embodiments, the button cover 100 is made from a polymeric material, such as a thermoplastic elastomer. Suitable polymeric materials are materials (e.g., thermoplastic elastomers) that have a Shore A hardness of 72 or greater, 75 or greater, or 78 or greater. The Shore A hardness of the material may be 85 or less or 82 or less. In some embodiments, the button cover 100 is made from a material having Shore A hardness between 72 and 85, or between 75 and 82. In some embodiments, the button cover 100 is molded (e.g., injection molded) from a thermoplastic elastomer. The button cover 100 may be made of the same material throughout. The button cover 100 may define a single integrally formed element.

In some embodiments, the button cover 100 and the face plate 12 are integrally formed. For example, the button cover 100 and the face plate 12 may be molded (e.g., injection molded) as one piece. In the embodiment shown, the button cover 100 and the face plate 12 are injection molded as one piece from a thermoplastic elastomer having a Shore A hardness between 75 and 82. Alternatively, the button cover 100 and the face plate 12 may be formed separately and attached or adhered to one another.

The button cover 100 and face plate 12 may be attached to the frame 14 in any suitable manner. For example, the button cover 100 and the face plate 12 may be attached to the frame 14 by overmolding or using an adhesive. In the example shown, the button cover 100 and the face plate 12 are overmolded onto the frame 14 by injection molding. The button cover 100 and the face plate 12 may be overmolded onto the frame 14 in a single step.

The button cover 100 may include a tactile indicator of the center of the button cover 100. For example, in some embodiments, the button cover 100 may include a raised motif 140, as show, for example, in FIGS. 2A and 2B. The tactile indicator allows a user to locate the button without seeing the front of the device 1.

The face plate 12 may further include a rim 129 on the second major face 120. The rim 129 may be disposed adjacent the groove 127 as shown, for example, in FIGS. 7A, 7D, and 7H. The rim 129 may circumscribe the groove 127. The rim 129 may increase surface area between the face plate 12 and the frame 14 and may help adhere the face plate 12 to the frame 14 when the face plate 12 is overmolded onto the frame 14.

The button cover 100 of the present disclosure may be used with an electrical switch or a mechanical switch. In one embodiment, the switch 20 is an electrical switch that includes a button 21. The switch 20 on the exemplary device 1 shown in the Figures is a dome switch. The button cover 100 could also be used in conjunction with, for example, a tactile switch.

Illustrative Embodiments

According to a first embodiment, a device comprises a device body comprising a first side; a switch disposed on the first side and comprising a button having a push direction and an active area perpendicular to the push direction; and a button cover. The button cover comprises a first major face facing outward and defining an actuatable area surrounded by a perimeter; and a second major face opposite of the first major face and facing the device. On the second major face there is a switch receiving area constructed to contact the active area of the switch; and a plurality of ribs extending from the switch receiving area toward the perimeter.

Embodiment 2 is the device of embodiment 1, wherein the actuatable area and the active area of the button have a ratio of 10 or more to 1; 20 or more to 1; 30 or more to 1; 40 or more to 1; 50 or more to 1; or 60 or more to 1.

Embodiment 3 is the device of embodiment 2, wherein the actuatable area and the active area of the button have a ratio of up to 200 to 1; up to 150 to 1; or up to 100 to 1.

Embodiment 4 is the device of any one of embodiments 1 to 3, wherein the first major face is parallel to the active area of the switch and the first side of the device body.

Embodiment 5 is the device of any one of embodiments 1 to 4, wherein the switch is a dome switch or a tactile switch. In one embodiment, the switch is a dome switch.

Embodiment 6 is the device of any one of embodiments 1 to 5, wherein the switch receiving area comprises a recess for receiving the button.

Embodiment 7 is the device of any one of embodiments 1 to 6, wherein the second major face comprises a groove adjacent the perimeter.

Embodiment 8 is the device of embodiment 7, wherein the plurality of ribs extend from the switch receiving area toward the groove. The plurality of ribs may extend from the switch receiving area to the groove.

Embodiment 9 is the device of any one of embodiments 1 to 8, wherein the plurality of ribs are equidistant from one another.

Embodiment 10 is the device of any one of embodiments 1 to 9, wherein adjacent ribs of the plurality of ribs are spaced from 10 to 45 degrees apart, from 15 to 36 degrees apart, or from 20 to 26 degrees apart, or about 22.5 degrees apart.

Embodiment 11 is the device of any one of embodiments 1 to 10, wherein the plurality of ribs comprises 8 or more, 10 or more, 12 or more, or 14 or more ribs, and 24 or fewer, 22 or fewer, 20 or fewer, or 18 or fewer ribs, or 16 ribs. The plurality of ribs may comprise from 8 to 24 ribs, from 10 to 22 ribs, or from 14 to 20 ribs. The plurality of ribs may comprise 16 ribs.

Embodiment 12 is the device of any one of embodiments 1 to 11, wherein the button cover comprises molded thermoplastic elastomer.

Embodiment 13 is the device of any one of embodiments 1 to 12, wherein the button cover is formed of a polymeric material having a Shore A hardness of 72 or greater, 75 or greater, or 78 or greater, and 85 or less or 82 or less.

Embodiment 14 is the device of any one of embodiments 1 to 13, wherein the button cover comprises the same material throughout.

Embodiment 15 is the device of any one of embodiments 1 to 14, wherein the button cover comprises a single integrally formed element. The button cover and a face plate of the device may comprise a single integrally formed element. The button cover and the face plate may be overmolded onto a frame of the device.

Embodiment 16 is the device of any one of embodiments 1 to 15, wherein, in a direction transverse to the first major face, the button cover has a first thickness in an area between ribs and a second thickness along a rib, and wherein the second thickness is at least 5%, at least 8%, or at least 10% greater than the first thickness, and up to 30% or up to 20% greater than the first thickness. The second thickness maybe from 5% to 30% greater, from 8% to 25% greater, or from 10% to 20% greater than the first thickness.

Embodiment 17 is the device of any one of embodiments 1 to 16, wherein, in a direction transverse to the first major face, the button cover has a first thickness in an area between ribs and a third thickness in the switch receiving area, and wherein the third thickness is at least 20%, at least 25%, or at least 30% of the first thickness, and up to 70%, up to 50%, or up to 40% of the first thickness. The third thickness may be from 20% to 70%, from 25% to 50%, or from 30% to 40% of the first thickness.

Embodiment 18 is the device of any one of embodiments 1 to 17, wherein the second major face comprises a groove adjacent the perimeter, wherein, in a direction transverse to the first major face, the button cover has a first thickness in an area between ribs and a fourth thickness along the groove, and wherein the fourth thickness is at least 20%, at least 25%, or at least 30% of the first thickness, and up to 70%, up to 50%, or up to 40% of the first thickness. The fourth thickness may be from 20% to 70%, from 25% to 50%, or from 30% to 40% of the first thickness.

Embodiment 19 is the device of any one of embodiments 1 to 18, wherein each of the plurality of ribs has a length and a cross-sectional shape transverse to the length, and wherein the cross-sectional shape is substantially rectangular.

Embodiment 20 is the device of any one of embodiments 1 to 19, wherein the actuatable area extends to the perimeter on all sides and wherein the switch is actuatable by applying a force in the push direction anywhere within the perimeter.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. It should be understood that this disclosure is not intended to be unduly limited by the illustrative embodiments and examples set forth herein and that such examples and embodiments are presented by way of example only with the scope of the disclosure intended to be limited only by the claims set forth here.

The invention claimed is:

1. A device comprising:

a device body comprising a first side;

a switch disposed on the first side and comprising a button having a push direction and an active area perpendicular to the push direction;

a button cover comprising:

a first major face facing outward and defining an actuatable area surrounded by a perimeter; and a second major face opposite of the first major face and facing the device; and on the second major face:

a switch receiving area constructed to contact the active area of the switch;

a plurality of ribs extending from the switch receiving area toward the perimeter;

a groove adjacent the perimeter; and a face plate further comprising a rim disposed adjacent and circumscribing the groove on the button cover, wherein the button cover and the face plate of the device are integrally formed as a single injection-molded thermoplastic elastomer element having a Shore A hardness between 75 and 82, the face plate and button cover being overmolded.

2. The device of claim 1, wherein the actuatable area and the active area of the button have a ratio of 10 or more to 1.

3. The device of claim 2, wherein the actuatable area and the active area of the button have a ratio of up to 200 to 1.

4. The device of claim 1, wherein the first major face is parallel to the active area of the switch and the first side of the device body.

5. The device of claim 1, wherein the switch is a dome switch.

6. The device of claim 1, wherein the switch receiving area comprises a recess for receiving the button.

7. The device of claim 1, wherein the plurality of ribs extend from the switch receiving area to the groove.

8. The device of claim 1, wherein the plurality of ribs are equidistant from one another.

9. The device of claim 1, wherein adjacent ribs of the plurality of ribs are spaced from 10 to 45 degrees apart.

10. The device of claim 1, wherein the plurality of ribs comprises 8 or more.

11. The device of claim 1, wherein the button cover comprises molded thermoplastic elastomer.

12. The device of claim 1, wherein the button cover comprises a same material throughout.

13. The device of claim 1, wherein the button cover comprises a single integrally formed element.

14. The device of claim 1, wherein, in a direction transverse to the first major face, the button cover has a first thickness in an area between ribs and a second thickness along a rib, and wherein the second thickness is at least 5% greater than the first thickness.

15. The device of claim 1, wherein, in a direction transverse to the first major face, the button cover has a first thickness in an area between ribs and a third thickness in the switch receiving area, and wherein the third thickness is at least 20% of the first thickness.

16. The device of claim 1, wherein the second major face comprises a groove adjacent the perimeter, wherein, in a direction transverse to the first major face, the button cover has a first thickness in an area between ribs and a fourth thickness along the groove, and wherein the fourth thickness is at least 20% of the first thickness.

17. The device of claim 1, wherein each of the plurality of ribs has a length and a cross-sectional shape transverse to the length, and wherein the cross-sectional shape is substantially rectangular.

18. The device of claim 1, wherein the actuatable area extends to the perimeter on all sides and wherein the switch is actuatable by applying a force in the push direction anywhere within the perimeter.

* * * * *